(12) United States Patent
Millard

(10) Patent No.: US 9,736,979 B1
(45) Date of Patent: Aug. 22, 2017

(54) MANURE FORK

(71) Applicant: Steven Leroy Millard, Downey, CA (US)

(72) Inventor: Steven Leroy Millard, Downey, CA (US)

( * ) Notice: Subject to any disclaimer, the term of this patent is extended or adjusted under 35 U.S.C. 154(b) by 0 days.

(21) Appl. No.: 15/150,908

(22) Filed: May 10, 2016

(51) Int. Cl.
    *A01D 9/00*     (2006.01)
    *A01C 3/04*     (2006.01)
    *A01K 1/01*     (2006.01)

(52) U.S. Cl.
    CPC .................. *A01D 9/00* (2013.01); *A01C 3/04* (2013.01); *A01K 1/0114* (2013.01)

(58) Field of Classification Search
    CPC . B21D 53/68; A01D 9/00; A01D 9/02; A01D 9/04; A01D 11/02; A01D 11/04; A01B 1/04; A01C 3/04; A01K 1/0114
    USPC ............................................ 294/55.5; 76/111
    See application file for complete search history.

(56) References Cited

U.S. PATENT DOCUMENTS

| | | | | |
|---|---|---|---|---|
| 566,868 A * | 9/1896 | Reed | ........................ | A01D 9/02 209/419 |
| 818,100 A * | 4/1906 | Kormil et al. | ........... | A01D 9/00 294/55.5 |
| 2,130,472 A * | 9/1938 | Rorabaugh | .............. | A01D 9/02 294/51 |
| 3,094,348 A * | 6/1963 | Preziosi | ................... | A01G 1/12 171/105 |
| 3,310,332 A * | 3/1967 | Nelson | .................. | E01H 1/1206 294/1.4 |
| 5,799,998 A * | 9/1998 | Gitterman, III | ......... | A01K 1/01 294/51 |
| 6,494,514 B1 * | 12/2002 | Stinnett | ..................... | A01D 9/00 15/405 |
| 8,172,287 B1 * | 5/2012 | Watson | .................... | A01D 9/00 294/55.5 |

OTHER PUBLICATIONS

Author: Steven Millard; Title: www.maxfork.com; Published: 2014.

* cited by examiner

*Primary Examiner* — Dean Kramer
(74) *Attorney, Agent, or Firm* — Eric Karich; Karich & Associates

(57) ABSTRACT

A manure fork has an elongate handle with a fork head mounted thereupon. The fork head includes a rear frame, a tine frame, and a pair of side panels. The rear frame has a pair of side edges, a lower edge that extends a width. The tine frame includes a lateral body that abuts the lower edge of the rear frame and extends the width of the rear frame, and a plurality of tines extending outwardly from the lateral body such that the tine frame is disposed in a generally planar configuration, the tine frame further having side edges. A plurality of cable ties are provided that each wrap around the lower edge of the rear frame and the lateral body of the tine frame for further securing the tine frame to the rear frame.

8 Claims, 5 Drawing Sheets

MANURE FORK

BACKGROUND OF THE INVENTION

Field of the Invention

This invention relates generally to a manure fork, and more particularly to a manure fork that has a superior construction, and tines having a triangular cross-section.

Description of Related Art

Manual cleaning of horse stalls or other livestock facilities is typically performed utilizing a manure fork, which consists of a fork head configured with a row of plastic or metal tines. A handle typically made of wood having a circular cross-sectional shape is attached to fork head for shoveling manure and raking bedding.

A problem with plastic manure forks known in the art is that the tines and associated fork head tend to break due to their heavy usage. There is a need in the field for a plastic manure fork that is constructed in a superior manner that is sturdy enough for extensive use without breaking. The present invention fulfills these needs and provides further advantages as described in the following summary.

SUMMARY OF THE INVENTION

The present invention teaches certain benefits in construction and use which give rise to the objectives described below.

The present invention provides a manure fork that includes an elongate handle and a fork head mounted on a distal end of the elongate handle. The fork head includes a rear frame, a tine frame, and a pair of side panels. The rear frame has a pair of side edges, a lower edge that extends a width, and further includes a receiver shaped to receive the distal end of the handle, the receiver being mounted on the rear frame with a plurality of fasteners. The tine frame includes a lateral body that abuts the lower edge of the rear frame and extends the width of the rear frame, and a plurality of tines extending outwardly from the lateral body such that the tine frame is disposed in a generally planar configuration, the tine frame further having side edges. A plurality of tine-fastening-screws extend through the lower edge of the rear frame and into the lateral body of the tine frame. A pair of side panels that are each attached to one of the side edges of the rear frame and one of the outer edges of the tine frame. A plurality of cable ties are provided that each wrap around the lower edge of the rear frame and the lateral body of the tine frame for further securing the tine frame to the rear frame.

A primary objective of the present invention is to provide a manure fork having advantages not taught by the prior art.

Another objective is to provide a manure fork manure fork that has a superior construction, to resist breaking.

A further objective is to provide a manure fork manure fork that has tines that are secured to a rear frame with a plurality of cable ties.

A further objective is to provide a manure fork manure fork that has tines having an acute trapezoid cross-section.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
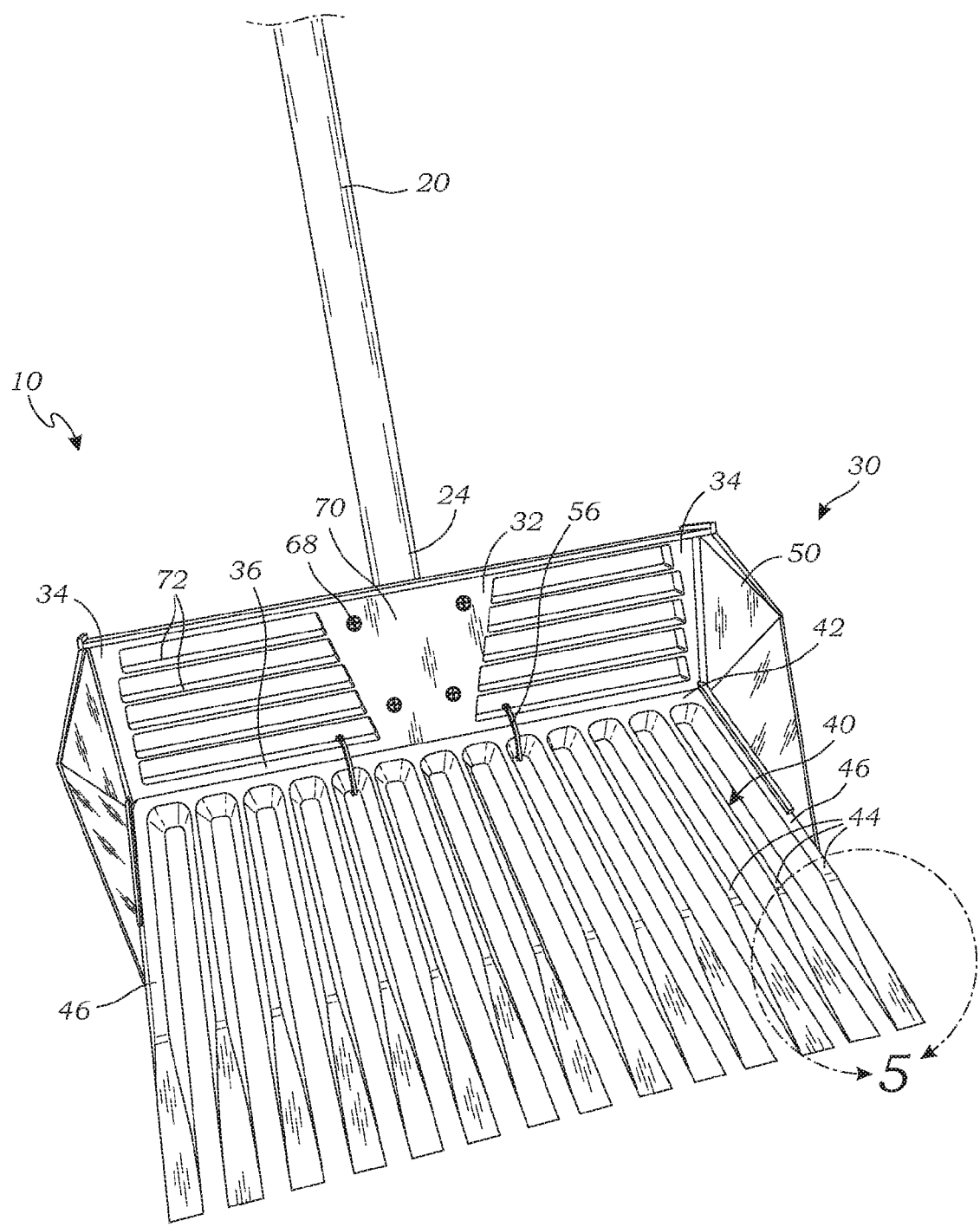
FIG. 1 is a perspective view of a manure fork according to one embodiment of the present invention.

FIG. 1 is a perspective view of a manure fork 10 according to one embodiment of the present invention. As shown in FIG. 1, the manure fork 10 includes an elongate handle 20 and a fork head 30. The fork head 30 may be mounted on a distal end 24 of the elongate handle 20, as discussed in greater detail below. The fork head 30 of this embodiment includes a rear frame 32, a tine frame 40, and a pair of side panels 50, that are all held together by fasteners described in greater detail below. These various components may therefore be replaced as needed if one of them breaks or is otherwise damaged.

As shown in FIG. 1, the rear frame 32 includes a pair of side edges 34, a lower edge 36 that extends a width W. The tine frame 40 includes a lateral body 42 that abuts the lower edge 36 of the rear frame 32 and extends the width W of the rear frame 32, and further has a plurality of tines 44 that extend outwardly from the lateral body 42 such that the tine frame 40 is disposed in a generally planar configuration. The tine frame 40 has side edges 46 for engaging the side panels 50. The side panels 50 also abut and engage one of the side edges 34 of the rear frame 32, so that the rear frame 32, the tine frame 40, and the side panels 50 together form the fork head 30. The various components may be fastened together with a variety of fasteners. One embodiment of the fasteners is discussed in greater detail below; and in alternative embodiments, alternative fasteners (e.g., mechanical fasteners such as screws, rivets, etc., chemical fasteners such as adhesives, etc., and non-mechanical/non-chemical fasteners such as welding, etc.) may be used, and should be considered within the scope of the present invention.

In the embodiment of FIG. 1, the fork head 30 further includes a plurality of cable ties 56 that each wrap around the lower edge 36 of the rear frame 32 and the lateral body 42 of the tine frame 40 for further securing the tine frame 40 to the rear frame 32. The cable ties 56 provide important binding strength to hold the rear frame 32 and the tine frame 40 together and prevent movement or separation during use.

Figure 2:
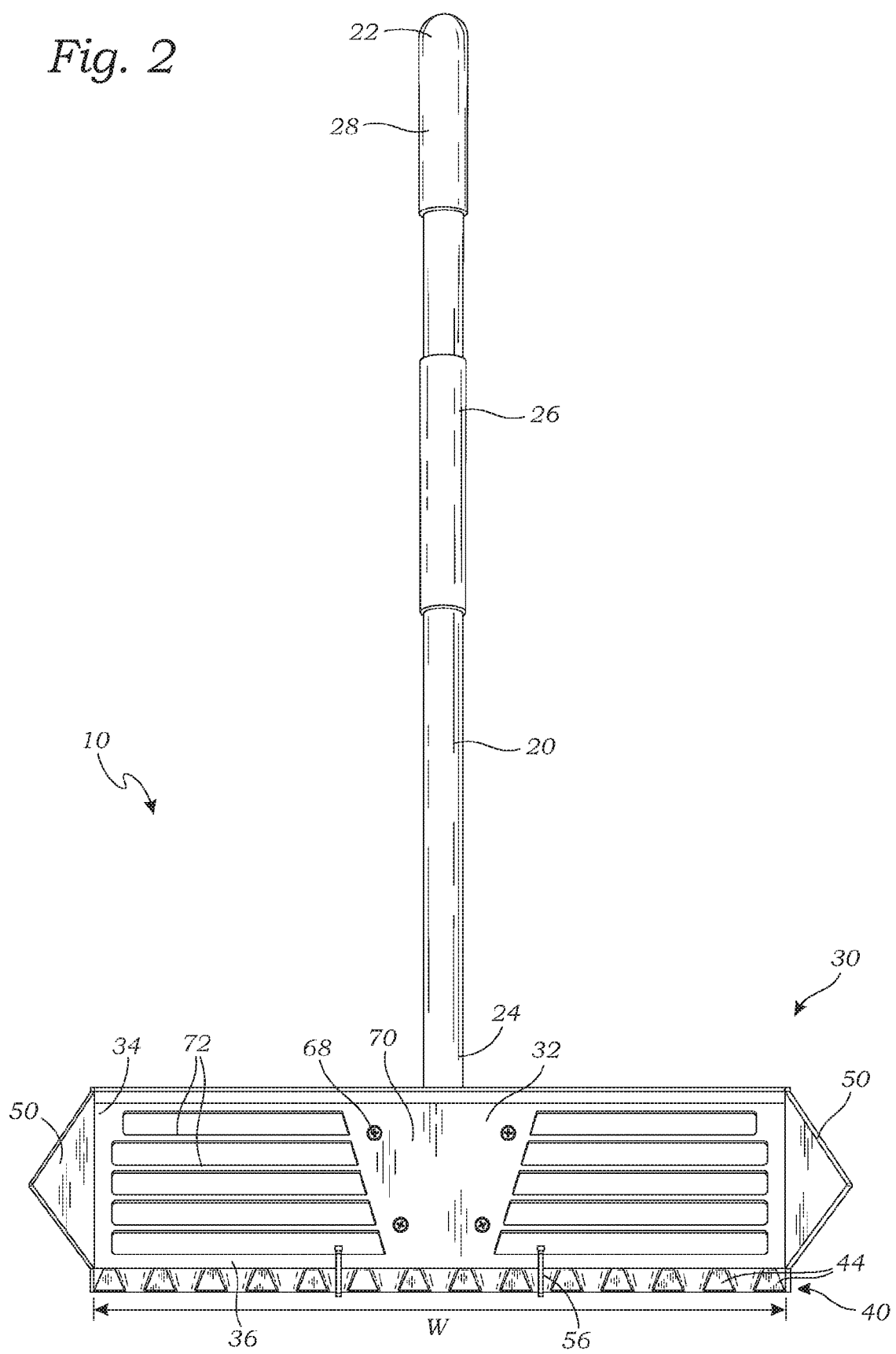
FIG. 2 is a front elevational view thereof.

FIG. 2 is a front elevational view of the manure fork 10. FIG. 1 illustrates the elongate handle 20, which includes a proximal end 22 opposite the distal end 24. In this embodiment, the elongate handle 20 includes a foam grip 26 between the proximal end 22 and the distal end 24. It may also include a top foam grip 28 that covers the proximal end 22. The foam grips 26 and 28 (defined to include any form of foam or equivalent gripping surface, known in the art) facilitate the user gripping the elongate handle 20 during use.

Figure 3:
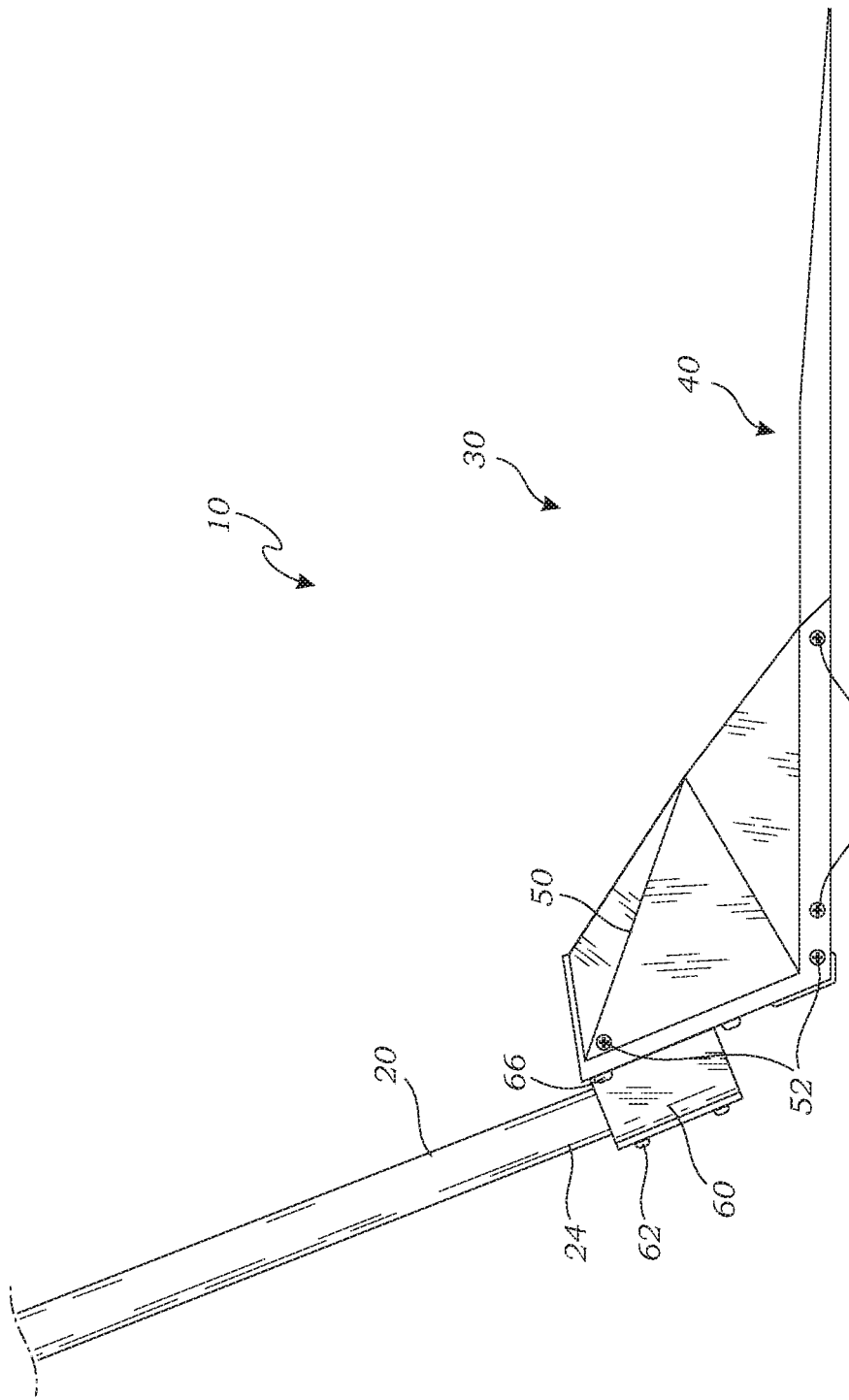
FIG. 3 is a side elevational view thereof.

FIG. 3 is a side elevational view of the manure fork 10. As shown in FIG. 3, the manure fork 10 may include a first plurality of fasteners 52 for fastening each of the side panels 50 to one of the side edges 34 of the rear frame 32. In this embodiment, the first plurality of fasteners 52 are screws that extend through one of the side panels 50 and into the side edge 34 of the rear frame 32.

As shown in FIG. 3, the manure fork 10 may further include a second plurality of fasteners 54 for fastening each of the side panels 50 to one of the side edges 46 of the tine frame 40. In this embodiment, the second plurality of fasteners 54 are screws that extend through one of the side panels 50 to one of the side edges 46 of the tine frame 40. As discussed above, alternative fasteners may be used in alternative embodiments.

Figure 4:
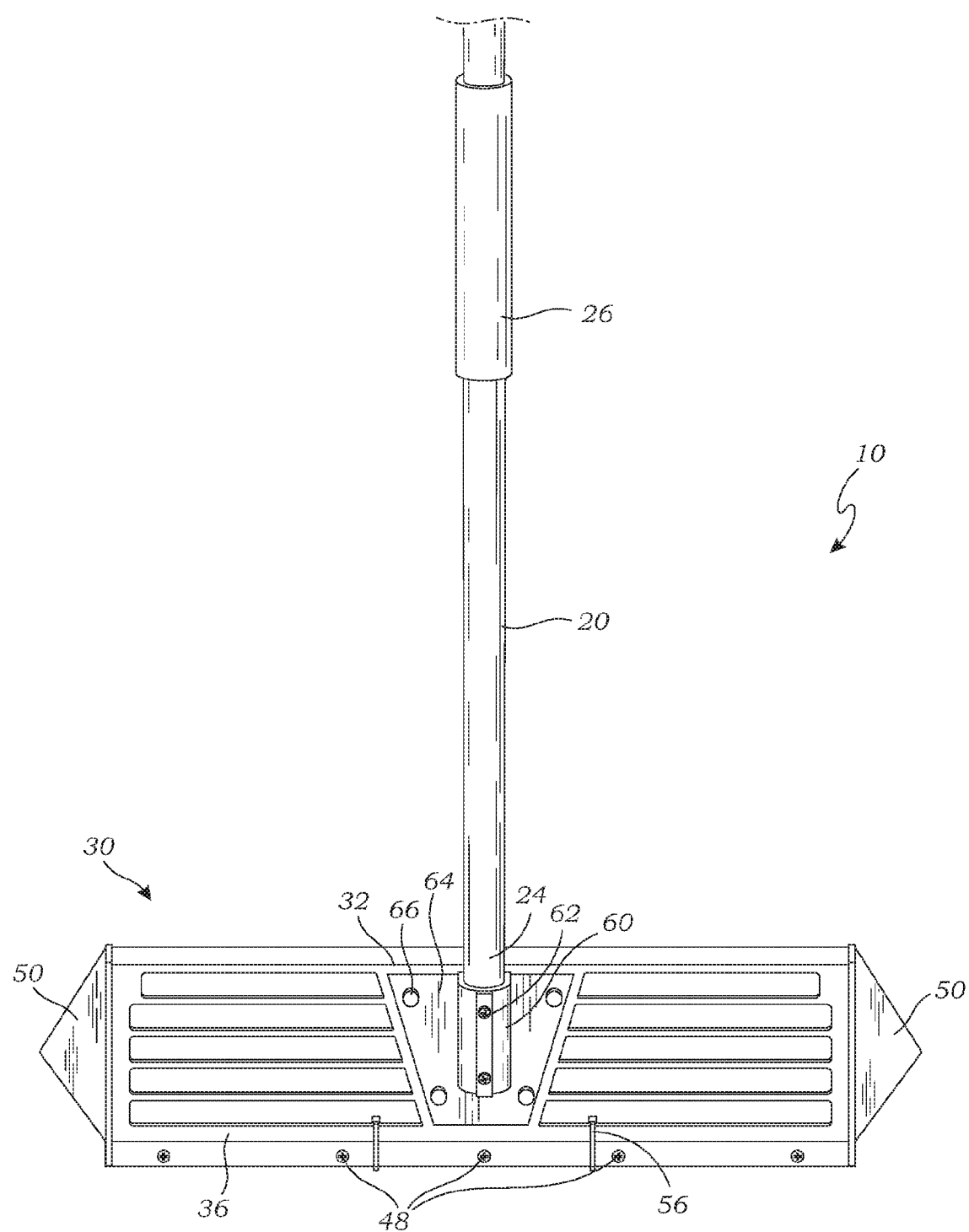
FIG. 4 is a rear elevational view thereof.

FIG. 4 is a rear elevational view of the manure fork 10. As shown in FIG. 4, the fork head 30 includes a plurality of tine-fastening-screws 48 that extend through the lower edge 36 of the rear frame 32 and into the lateral body 42 of the tine frame 40. The tine-fastening-screws 48, in conjunction with the plurality of cable ties 56, provide a great deal of the strength of the manure fork 10, especially during vigorous use of the manure fork 10.

As shown in FIGS. 3 and 4, the rear frame 32 may further include a receiver 60 shaped to receive the distal end 24 of the handle 20. Screws 62 secure the distal end 24 within the receiver 60. The receiver 60 may be mounted on the rear frame 32 with a plurality of fasteners 62. In the present embodiment, the rear frame 32 includes a solid central portion 70 with a plurality of lateral ribs 72 on either side. In this embodiment, the receiver 60 includes a back-plate 64 that includes reinforced portions 66, and the back-plate 64 is fastened to the solid central portion 70 (shown in FIG. 1) of the rear frame 32 with the plurality of fasteners such as screws 68 (shown in FIG. 1) that engage the reinforced portions 66. The screws 68 extend through the solid central portion 70 of the rear frame 32 and threadedly engage reinforced portions 66 which extend rearwardly from the back-plate 64 of the receiver 60.

Additional screws may extend through the receiver 60 and into the elongate handle 20, for removably securing the elongate handle 20 inside the receiver 60.

Figure 5:
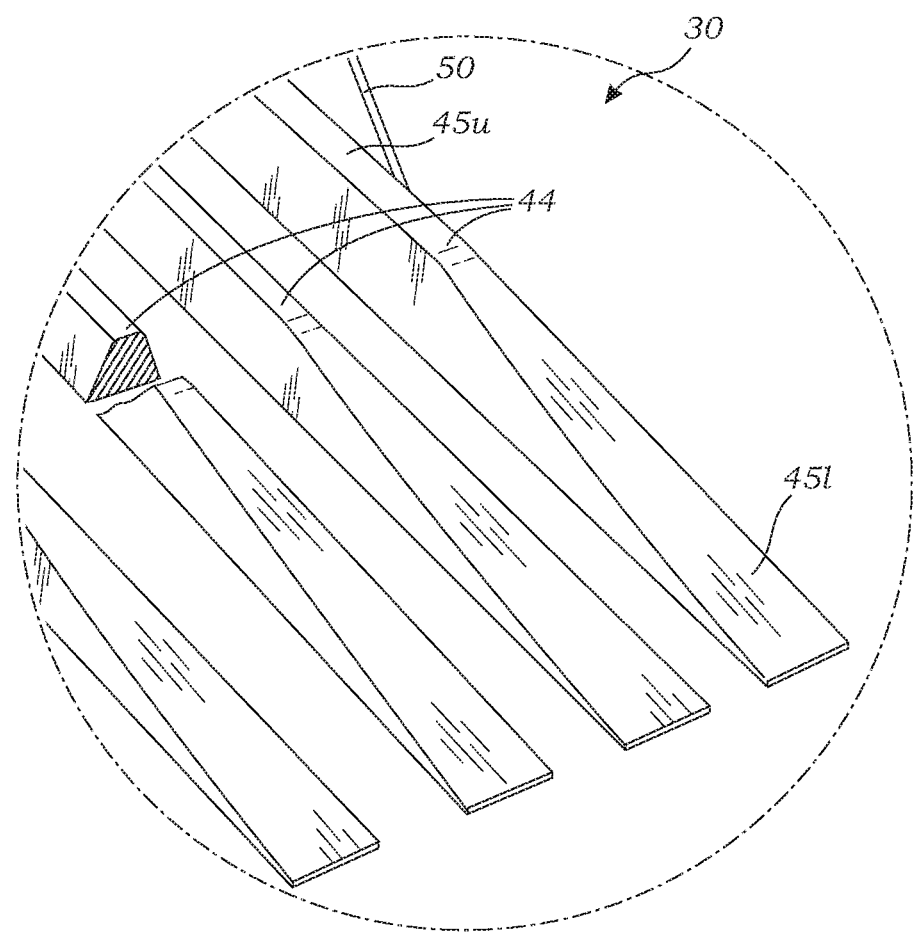
FIG. 5 is a close up view of the tines of the manure fork, with one of the tines shown broken away to illustrate an acute trapezoid cross-sectional view of the tine.

FIG. 5 is a close up view of the tines of the manure fork 10, with one of the tines 44 shown broken away to illustrate a cross-sectional view of the tine 44. As shown in FIG. 5, each of the plurality of tines 44 has a cross-section that is in the shape of an acute trapezoid for at least most of a length of the tine 44. As shown in FIG. 5, in this embodiment each of the plurality of tines 44 includes an upper portion 45U that has a greater height and a smaller top surface, and a lower portion 45L that has a lower height and a larger top surface.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by the following claims.

What is claimed is:

1. A manure fork comprising:
    an elongate handle having a proximal end and a distal end; and
    a fork head mounted on the distal end of the elongate handle, the fork head comprising:
        a rear frame having a pair of side edges, a lower edge that extends a width, and further includes a receiver shaped to receive the distal end of the handle, the receiver being mounted on the rear frame with a plurality of fasteners;
        a tine frame that includes a lateral body that abuts the lower edge of the rear frame and extends the width of the rear frame, and a plurality of tines extending outwardly from the lateral body such that the tine frame is disposed in a generally planar configuration, the tine frame further having side edges;
        a plurality of tine-fastening-screws that extend through the lower edge of the rear frame and into the lateral body of the tine frame;
        a pair of side panels that are each attached to one of the side edges of the rear frame and one of the side edges of the tine frame; and
        a plurality of cable ties that each wrap around the lower edge of the rear frame and the lateral body of the tine frame for further securing the tine frame to the rear frame.

2. The manure fork of claim 1, wherein each of the plurality of tines has a cross-section that is in the shape of an acute trapezoid for at least most of a length of the tine.

3. The manure fork of claim 1, further comprising a first plurality of fasteners for fastening each of the side panels to one of the side edges of the rear frame.

4. The manure fork of claim 3, further comprising a second plurality of fasteners for fastening each of the side panels to one of the side edges of the tine frame.

5. The manure fork of claim 1, wherein the receiver includes a back-plate and the rear frame includes a solid central portion, and wherein the back-plate is fastened to the solid central portion of the rear frame with the plurality of fasteners which comprise screws.

6. The manure fork of claim 5, wherein the screws, which are provided for fastening the back-plate to the rear frame, extend through the solid central portion of the rear frame and threadedly engage reinforced portions of the back-plate of the receiver.

7. The manure fork of claim 6, wherein the rear frame further comprises a plurality of lateral ribs on either side of the solid central portion of the rear frame.

8. A manure fork comprising:
    an elongate handle having a proximal end and a distal end; and
    a fork head mounted on the distal end of the elongate handle, the fork head comprising:
        a rear frame having a pair of side edges, a lower edge that extends a width, and further includes a receiver shaped to receive the distal end of the handle, the receiver being mounted on the rear frame with a plurality of fasteners;
        a tine frame that includes a lateral body that abuts the lower edge of the rear frame and extends the width of the rear frame, and a plurality of tines extending outwardly from the lateral body such that the tine frame is disposed in a generally planar configuration, the tine frame further having side edges;
        a plurality of tine-fastening-screws that extend through the lower edge of the rear frame and into the lateral body of the tine frame;
        a pair of side panels that each abut one of the side edges of the rear frame and one of the side edges of the tine frame;
        a first plurality of fasteners for fastening each of the side panels to one of the side edges of the rear frame;

a second plurality of fasteners for fastening each of the side panels to one of the side edges of the tine frame;

a plurality of cable ties that each wrap around the lower edge of the rear frame and the lateral body of the tine frame for further securing the tine frame to the rear frame; and wherein each of the plurality of tines has a cross-section that is in the shape of an acute trapezoid for at least most of a length of the tine.

\* \* \* \* \*